DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1324

T883,028

POLYESTER COMPOSITIONS

Gordon C. Newland and Raymond C. Harris, both of P.O. Box 511, Kingsport, Tenn. 37662, and John W. Tamblyn, P.O. Box 92, Jonas Ridge, N.C. 28641

Continuation of application Ser. No. 717,422, Mar. 29, 1968. This application June 1, 1970, Ser. No. 41,733

Int. Cl. C08g *51/66;* C09b *1/16*

U.S. Cl. 260—40

No Drawing. 18 Pages Specification

A thermoplastic composition comprising a polyester and a fluorescing amount of a triphenodioxazine compound having the formula

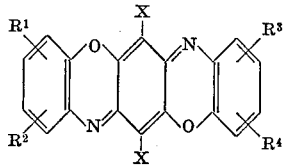

in which each X is halogen;

each $R^1$, $R^2$, $R^3$ and $R^4$, when taken independently, is hydrogen, halogen, nitro, amino, acetamido, benzamido, phenylamino, alkyl, halogenated alkyl, alkoxy, phenyl, substituted phenyl and phenoxy;

$R^1$ and $R^2$, when taken together with the adjacent carbon atoms to which they are attached, form an acryl or heterocyclic ring;

and $R^3$ and $R^4$, when taken together with the adjacent carbon atoms to which they are attached, form an aryl or heterocyclic ring.